United States Patent [19]

Vaseen

[11] 4,139,596

[45] Feb. 13, 1979

[54] PRODUCING SULPHURIC ACID

[76] Inventor: Vesper A. Vaseen, 9840 W. 35th Ave., Wheatridge, Colo. 80033

[21] Appl. No.: 875,739

[22] Filed: Feb. 6, 1978

[51] Int. Cl.$^2$ .................... C01B 17/74; C01B 17/68; B01K 1/00
[52] U.S. Cl. .................................. 423/522; 204/174; 423/532
[58] Field of Search .............. 204/164, 174, 176, 177; 250/531–541; 423/224, 235, 242, 393, 522, 532

[56] References Cited

U.S. PATENT DOCUMENTS

| 3,458,419 | 7/1969 | Fuhrmann et al. | 204/174 |
| 3,762,133 | 10/1973 | Marriman et al. | 55/44 |
| 3,979,193 | 9/1976 | Sikich | 55/123 |
| 4,049,398 | 9/1977 | Vaseen | 55/3 |

FOREIGN PATENT DOCUMENTS 600803  6/1960  Canada .................................. 423/221

Primary Examiner—F.C. Edmundson

[57] ABSTRACT

This invention is based on the factors that both oxygen gas and oxides of sulphur as well as hydrogen sulphide are highly soluble in saturated, halogenated hydrocarbon liquids which are also dielectric liquids. The absorber liquid, saturated with dissolved oxygen and sulphur dioxide and/or hydrogen sulphide is then ozonated using the solvent or absorber liquid dielectric as the dielectric in an ozone generator. The sulphur trioxide produced by the ozone reacting with the sulphur dioxide and hydrogen sulphide in the presence of a catalyst (accelerates reactions) also carried in the liquid dielectric or, in the liquid stream at the ozonator, is then mixed with sufficient water to absorb the sulphur trioxide and produce the strength of sulphuric acid desired from the system. The sulphuric acid having a different specific gravity than the inert absorber liquid is gravity separated from the absorber liquid. The absorber liquid is returned to the scrubber or dissolver of the gaseous sulphur compounds for recycle use.

6 Claims, No Drawings

PRODUCING SULPHURIC ACID

REFERENCES:

U.S. Pat. 1,074,106; Sept. 30, 1913; H. Dumars U.S. Pat. No. 2,992,540; July 18, 1961; Grosse, Haverford, and Streng U.S. Pat. No. 3,186,930; June 1, 1965; Cook & Clarence U.S. Pat. No. 3,342,721; Sept. 19, 1967; N. R. Dibelius, et. al. U.S. Pat. No. 3,762,133; Oct. 2, 1973; Merriman, et. al. U.S. Pat. No. 2,616,927; Oct. 2, 1973; Edward A. Kauck, et. al. U.S. Pat. No. 2,594,272; Oct. 2, 1973; Edward A. Kauck, et. al. U.S. Pat. No. 3,766,051; Oct. 16, 1973; J. Bollyky.

PUBLICATIONS

Solubility and Entropy of Solution of He, $N_2$, $O_2$, $C_2H_6$, $CO_2$, and $SF_6$ in various solvents; regularity of gases solubilities; Kobatake and Hildebrand; Dept. of Chem.; Univ. of Cal,; Aug. 22, 1960.

Chemistry of Organic Fluorine Compounds; Milos Hudlicky; McMillan Co,; N.Y.; 1962.

Fluorine Chemistry; Ed. Dr. J. H. Simons; Research Center; Univ. of Florida; Gainsville, Florida; Academic Press; N.Y.; 1954.

Chemical Engineers' Handbook; Fifth Ed.; Perry; McGraw Hill; Sec. 14 – Gas Absorption.

BACKGROUND OF THE INVENTION

FIELD OF THE INVENTION

Principal uses of sulphuric acid are in the manufacture of fertilizers and in water treatment.

Sulphuric acid ($H_2SO_4$) is one of the most important "Heavy Chemicals", that is, marketed by the ton.

Sulphuric acid has been commercially produced since about 1730, when it was used principally for medicinal purposes. In 1749 the "Glass Bulb" method of pounds of production was changed to the improved "Lead Chamber" process for tons of production per day.

Currently two production methods are in common use. The first known as the "Lead Chamber", being an improved (18th) Eighteenth Century method. In this process sulphur is burned to produce sulphur dioxide, and then in the presence of a catalyst, further oxidized to sulphur tri-oxide which in the presence of water forms sulphuric acid. The second process is known as the "Contact" process; which involves the oxidation of sulphur dioxide with air or oxygen at high temperatures in contact with a solid catalyst followed by mixing the sulphur tri-oxide with sufficient water to produce the strength of acid desired.

DESCRIPTION OF PRIOR ART

Many industrial processes as well as natural gas and liquid wells; contain in the waste products; compounds of sulphur such as hydrogen sulphides, and sulphur dioxide. These materials are recoverable such as dissolving hydrogen sulphides and sulphur dioxide in MEA (Monoethylamine).

Waste gases are scrubbed with amine so that the mol loading of amine will not exceed 0.30 mol $H_2S$ per mol MEA. This requires 2GPM of 20% MEA for each 1% $H_2S$ in 1-MMCF per day. The 20% amine is stripped of the $H_2S$ by raising the temperature of the liquid with steam to a maximum of 300° F. (50 # steam at 298° F.). The Claus process converts hydrogen sulphide contained in acid gases. In this process one third (1/3) of the hydrogen sulphide is burned to form sulphur dioxide; and the remaining gas mixture pases over an alumina catalyst to produce elemental sulphur. The temperature of the entire system must be maintained above 248° F., the melting point of sulphur. Water vapor and sulphur are the end products as per following equations.

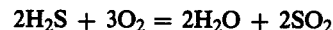
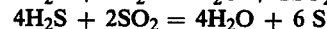
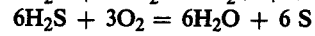

$2H_2S + 3O_2 = 2H_2O + 2SO_2$
$4H_2S + 2SO_2 = 4H_2O + 6S$
$6H_2S + 3O_2 = 6H_2O + 6S$

Desulphurization of flue gases is also accomplished by scrubbing the gases with limestone and/or magnesium oxides; to precipitate calcium sulphite;

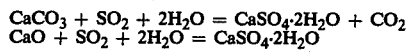

$CaCO_3 + SO_2 + 2H_2O = CaSO_4 \cdot 2H_2O + CO_2$
$CaO + SO_2 + 2H_2O = CaSO_4 \cdot 2H_2O$ and with magnesia.

$SO_2 + H_2O = H_2SO_3$

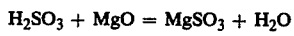
$H_2SO_3 + MgO = MgSO_3 + H_2O$

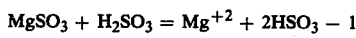
$MgSO_3 + H_2SO_3 = Mg^{+2} + 2HSO_3 - 1$

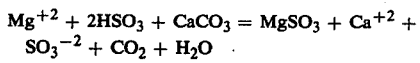
$Mg^{+2} + 2HSO_3 + CaCO_3 = MgSO_3 + Ca^{+2} + SO_3^{-2} + CO_2 + H_2O$ The major precipitate being:

$Ca^{+2} + SO_3^{-2} + \frac{1}{2}H_2O = CaSO_3 \cdot \frac{1}{2}H_2O$ Some oxidation takes place as follows

$SO_3^{-2} + \frac{1}{2}O_2 = SO_{4-2}$

Then $Ca^{+2} + SO_4^{-2} + 2H_2O = CaSO_4 \cdot 2H_2O$

Many other processes are in use to remove hydrogen sulphides, flowers of sulphur and oxides or sulphur from waste gas streams. Most of these are principally concerned with removal of the sulphur compounds; without real concern for salvage of the sulphur as sulphuric acid; unless it be a secondary recovery from lime or magnesia sludges; or from flowers of sulphur product.

SUMMARY OF THE INVENTION

This invention relates to both the removal of hydrogen sulphide, sulphur dioxide and particulate sulphur from gases emitted from industrial and natural sources, oil and gas wells, as well as products of combustion; thus not only removing the sulphur source in air pollution from the atmosphere; but converting the sulphur and sulphur compounds to usable sulphuric acid.

The family of halogenated hydrocarbon, inert liquids have "space" within the molecular structure which can be filled by various gases; such as hydrogen sulphide and various oxides of sulphur. The affinity of this family of inert liquids for dissolving or absorbing gases makes them suitable for use as the "scrubbing" liquid to absorb these gases from mixtures of various gases.

Scrubbing or intimately mixing a gas mixture stream containing hydrogen sulphides, mercaptans, particulate sulphur and various oxides of sulphur, removes them from the gas stream. Since many gases, particularly products of combustion, contain some air or free oxygen; the halogenated hydrocarbons liquids, also dissolves or absorbs oxygen as well. Insufficient oxygen in the gas stream being freed of sulphur and its compounds; to later react with the sulphur and its compounds to oxidize the sulphur and its compounds to sulphur trioxide, can be supplemented if necessary.

The halogenated hydrocarbons, hereinafter called the absorber liquid is also a dielectric as well as is used as a solvent for gases, is caused to pass through an ozonator. The dissolved sulphur and its compounds and oxygen in the dielectric liquid when in the gap between two high voltage, (usually 20,000 ±) electrodes; which is the zone of a corona, due to the alternating or pulsating current across the dielectric liquid between the electrodes, converts the oxygen to ozone. ($3O_2$ + energy = $2O_3$ (ozone)). The usual conversion of oxygen to ozone in a gas stream is in the range of one (1) to (2) percent ozone ($O_3$); however, in the ozonation of the oxygen intimately mixed with sulphur, and sulphur compounds; the ozone immediately reacts with the various sulphur compound to oxidize them to sulphur trioxide (use of a catalyst accelerates the oxidation reaction as well as makes it more efficient); thus favoring additional ozone formation or production; and thus a more efficient conversion of electrical energy to chemical energy; as well as less loss of electrical energy to heat energy than the previous use of dry air or oxygen ozonators.

Water is nonmiscible with the solvent or absorber dielectric liquid; therefore when the liquid dielectric leaves the ozonator and is intimately mixed with water, the dissolved sulphur trioxide reacts with the water as liquid sulphuric acid is removed from the absorber liquid. The greater the pressure of the scrubbing system the greater the quantity of dissolved gases in the same weight of absorber liquid; and thus the greater the quantity of sulphuric acid per unit weight of absorber liquid.

The quantity of water used is dependent on the strength of the acid desired as product acid.

Both the ozonation and water mixing are exothermic which raises the temperature of the dielectric absorber liquid; unless a means of heat removal is part of the process.

The pressure, if a pressure operated system, is then released and the mixture of absorber liquid and sulphuric acid cooled to near ambient; then gravity separated.

The absorber, dielectric liquid can be selected to have a specific gravity sufficiently different than the strength of acid selected; as to efficiently separate the two liquids by clarifier or centrifuge.

The absorber liquid is recycled to reuse in the gases scrubber and the acid removed to storage or use.

DESCRIPTION OF THE PREFERRED EMBODIMENTS

The gases absorbent dielectric liquid is preferably on which has physical/chemical characteristics as follows:
1 - Boiling points in excess of 100° C. (212° F.)
2 - Low vapor pressures - non volatile
3 - Specific heat capacities greater than 0.20
4 - Superatmospheric critical pressures
5 - Nonmiscible with water
6 - Non toxic to organic life
7 - Stable chemical/physical properties
8 - Reusable for inumerable cycles
9 - Non-biodegradable
10 - Non flammable - no flash point
11 - Affinity for dissolving oxygen and ozone.

The preferred solvent or absorber liquids are the fully halogenated, low molecular weight saturated hydrocarbons or mixtures thereof, in which the molecule contains at least eight carbon atoms and at least one fluorine atom, the remaining substitute atoms being another halogen or nitrogen.

The gaseous stream is scrubbed with the absorber liquid in an amount and for a time period required to absorb the sulphur bearing gases and remove them to the efficiency desired.

For example the stack gases from a power plant burning 100 pounds of coal per minute containing 0.022% sulphur contain 4.40 pounds per minute of sulphur dioxide ($SO_2$). The coal is burned, for example, with 125% surplus air, which thus provides excess oxygen required for the oxidation of the sulphur dioxide to sulphur trioxide.

The scrubber using a perfluorocarbon $C_{10}F_8$, for example, and operating at 100° F. and 40 ATM's absorb 3.50 pounds of oxygen and 0.70 pounds of sulphur dioxide per each 1000 pounds of absorber liquid used.

A scrubber gases/liquid contact period is established along with a rate of absorber/scrubber liquid of 307 GPM per each 1000 ACFM of stack gases.

The sulphur dioxide as absorbed in the absorber liquid dielectric as received from a scrubber operating at an established temperature of for instance 100° F. (38° C.) and 40 atmospheres is injected into the oxonator machine.

The ozononator machine, operates to convert the dissolved oxygen and sulphur dioxide, for instance under the following conditions:

Ozonator electrodes for each 1000 square inches (6452 $cm^2$) of opposing electrode area; at 20,000 ± volts (RMS); and 60Hz with an electrode gap of 0.10 inches (0.254 cm); produces 1.25 pounds (0.467Kg) of one percent (1%) ozone per hour. Power required is approximately 1000 watts. Heat is produced at a maximum of 800 watts or 51.25 BTU/Min.

The dielectric liquid with a specific heat of 0.27 BTU/Pound and 51.25 BTU per minute of heat production therefore requires 18.98 pounds of dielectric to retain a maximum of 10° F. (7° C.) rise in temperature.

An ozone system designed to produce the 1.10 pounds of ozone per minute requires 88 pairs of 1000 square inch units; or their equivalent.

Oxygen conversion to ozone takes place in a fraction of a second.

An ozone generator is indicated, for example, with 88,000 sq. inches and a gap of 0.10 inches has a total gap volume of 8800 cubic inches (144.232 $cm^3$) (5.0926 $Ft^3$.

The dielectric liquid required for sulphur dioxide absorption is 6280 gallons per minute (14 cubic feed per second).

The rate of flow through the ozonator with a one (1) second contact time is therefore 14 cubic feet per second. (2.749 $Ft^3$ per each 1-$Ft^3$ of electrode gap volume.)

Heat produced in the system is from several sources. The oxidation of oxygen to ozone in the ozonator due to the inefficiency of conversion of electrical energy to chemical is 51.25 BTU/min. per each 1000 square inches of electrode pairs. To produce the required 1.10 pounds of ozone with 88 pairs of electrodes, 4,500 BTU is generated per minute.

Oxidation of the sulphur dioxide to sulphur trioxide produces 1957 BTU per pound (2.21 Kg cal/gram). The 2.20 pounds of sulphur per minute therefore provide exothermic heat of 9900 BTU/minute.

Heat of solution provided by the absorption of the sulphur trioxide in the water provides 326 BTU per pound of sulphur trioxide (0.1881 Kg cal/gram). The 5.55 pounds of sulphur trioxide produce 1809 BTU/minute to the system.

Total exothermic heat produced and necessary to be removed for example by a heat exchanger is 16,209 BTU (4085 kilogram-calories) per minute.

The efficiency of conversion on each pass through the ozonator is approximately 50% with 0.1 second retention time and 10 atmospheres, to 65% with 0.1 second retention time and 40 atmospheres: Both without use of a catalyst. Use of a catalyst such as vanadium pentoxide $V_2O_5$ or platimun expedite the efficiency of chemical reaction to as much as 99% conversion of sulphur dioxide to sulphur trioxide in the same 0.10 second of retention time in the ozonator corona. Catalyst used is finely divided (200 ± mesh) so it will remain in suspension in both the scrubber/contactor as well as the ozonator.

Catalyst which settles out in the gravity clarifier or fluorocarbon separation is recovered, washed and recycled to use.

Catalyst is used for example at the rate of 0.10% of the weight of sulphur in the process. Catalyst requires replacement at approximately the rate of 20 pounds per each ton of sulphur processed to sulphur trioxide.

Cooled, depressurized liquid absorber liquid and sulphuric acid as removed from the ozonator is separated in a gravity clarifier or centrifuge. The absorber liquid has a specific gravity of for example of 1.88. The sulphuric acid, produced in this example, has a specific gravity as 10.8% acid of 1.06 which rises to the surface and floats on the fluorocarbon liquid. The acid is decanted off the top to storage, concentration and/or use. The catalyst with a specific gravity of 4 (plus) settles to the bottom of the settler or separator where it is removed for recycle use. The absorber liquid is removed near the bottom for recycle to the scrubber/contactor.

Due to the difference in the specific gravities of the acid and absorber liquids; clarification is accomplished in a short period of time; approximately ten (10) minutes. A surface settling rate of less than 1000 gallons per square foot per day; for the acid is sufficient. Overflow weir rate should be less than 15000 gallons per foot of length per day.

What is claimed is:

1. A method of producing sulfuric acid which comprises scrubbing a gas stream containing gaseous sulfur compounds with a halogenated hydrocarbon liquid dielectric under superatmospheric pressure, absorbing oxygen in the halogenated hydrocarbon liquid, passing the solution through an ozonator to oxidize the absorbed sulfur containing compounds to $SO_3$, extracting the effluent from the ozonator with water to form sulfuric acid.

2. The method of claim 1 in which the extracted halogenated hydrocarbon is recycled.

3. The method of claim 1 in which the oxidation is carried out in the presence of a catalyst.

4. The method of claim 3 in which the catalyst is selected from the group consisting of platinum and $V_2O_5$.

5. The method of claim 4 in which the catalyst is finely divided.

6. The method of claim 4 in which the weight of the catalyst is about 0.1% of the weight of the sulfur.

* * * * *